United States Patent
Tessier, Jr. et al.

(10) Patent No.: US 8,874,336 B2
(45) Date of Patent: Oct. 28, 2014

(54) METHODS AND SYSTEMS FOR END OF LINE FULL VEHICLE AUTOMATIC TRANSMISSION QUICK BED-IN PROCEDURE

(75) Inventors: Raymond J. Tessier, Jr., Onsted, MI (US); Anthony Golletti, Howell, MI (US); Thomas Kieffer, Prattville, AL (US)

(73) Assignees: Hyundai America Technical Center, Inc., Superior Township, MI (US); Kia Motors Corporation, Seoul (KR); Hyundai Motor Company, Seoul (KR)

( * ) Notice: Subject to any disclaimer, the term of this patent is extended or adjusted under 35 U.S.C. 154(b) by 166 days.

(21) Appl. No.: 13/385,685

(22) Filed: Feb. 29, 2012

(65) Prior Publication Data

US 2013/0226417 A1    Aug. 29, 2013

(51) Int. Cl.
*G06F 7/00* (2006.01)
*G06F 17/00* (2006.01)

(52) U.S. Cl.
USPC ............... 701/59; 701/51; 701/55; 701/58; 701/60; 701/61

(58) Field of Classification Search
USPC ............. 701/55, 58, 59, 51, 60, 61; 477/34
See application file for complete search history.

(56) References Cited

U.S. PATENT DOCUMENTS

| 5,224,577 A * | 7/1993 | Falck et al. ................ 74/336 R |
| 7,421,325 B2 * | 9/2008 | Geist et al. ...................... 701/51 |
| 2008/0194384 A1 * | 8/2008 | League et al. ................ 477/130 |

FOREIGN PATENT DOCUMENTS

| JP | 11-094061 A | 4/1999 |
| KR | 1020070014566 | 2/2007 |
| KR | 1020080096902 | 11/2008 |
| WO | WO2012019710 A1 * | 2/2012 |

* cited by examiner

*Primary Examiner* — Khoi Tran
*Assistant Examiner* — Robert Nguyen
(74) *Attorney, Agent, or Firm* — Edwards Wildman Palmer LLP; Peter F. Corless

(57) ABSTRACT

Featured is are methods and systems for bedding-in an automatic transmission of a vehicle prior to delivery of the vehicle to an end customer. Such a bedding-in method is performed so as to reduce the occurrence of shifting problems or concerns occurring during the initial stages of ownership of the vehicle. More particularly, such a bedding-in method includes providing an automatic transmission having a controller that is configured to measure and learn about powertrain variation(s) and configured to adapt one or more operational parameters associated with shifting of the automatic transmission. Such a method also includes operating the vehicle according to a predetermined protocol before the vehicle reaches an end customer. Such a protocol being established so the transmission controller can learn about powertrain variations and adapt operation of the transmission to minimize effects on shifting of the transmission.

14 Claims, 13 Drawing Sheets

❖ FOUR KEY SHIFTS IS USED TO CHARACTERIZE EACH CLUTCH CONTROL SOLENOID
| SHIFT | CLUTCH LEARNED | LEARNING APPLIED TO SHIFTS |
|---|---|---|
| 1-2 UPSHIFT | 2-6 BRAKE | 1-2, 2-3, 5-6, 6-5, 6-4, 6-3, 5-2, 4-2, 3-2, 2-1 |
| 2-3 UPSHIFT | 3-5-R | 2-3, 3-4, 4-5, 5-6, 6-5, 6-3, 5-4, 5-2, 4-3, 3-2, 3-1, N-R |
| 3-4 UPSHIFT | O/D | 3-4, 6-2, 5-3, 5-2, 4-3, 4-2, 4-1 |
| N-D STATIC SHIFT | U/D | 4-5, 6-4, 6-3, 6-2, 5-4, 5-3, 5-2, N-D |
FIG. 3B
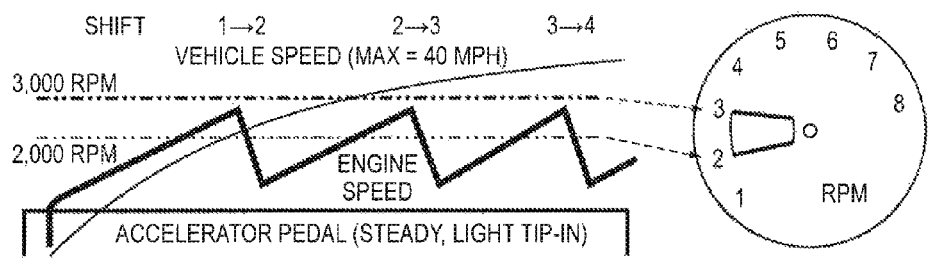
FIG. 4
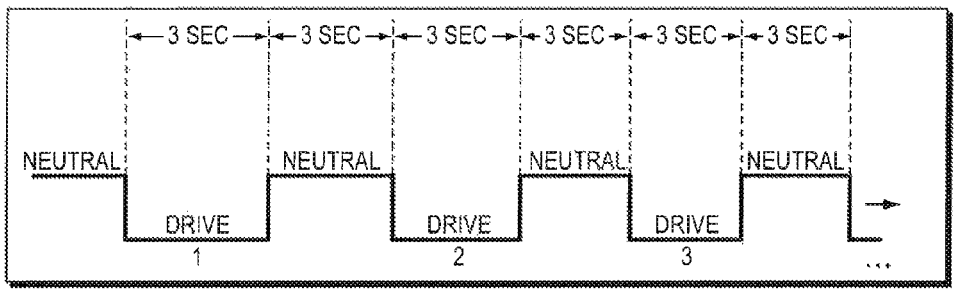
FIG. 5

METHODS AND SYSTEMS FOR END OF LINE FULL VEHICLE AUTOMATIC TRANSMISSION QUICK BED-IN PROCEDURE

FIELD OF INVENTION

The present invention generally relates to methods, systems and devices for bedding-in an automatic transmission so that the automatic transmission can adapt to powertrain variations and more particularly for such methods and systems relating to an automatic transmission quick bed-in process that measures, learns and adapts to powertrain variation(s) before the vehicle reaches an end customer.

BACKGROUND OF THE INVENTION

Minor shift quality (S/Q) issues are sometimes found in new production vehicles due to part to part variation in engine and automatic transmission manufacturing. It is not uncommon for shift quality issues to be one of the most common complaints reported by customers of vehicle programs. A significant portion of these complaints regarding shift quality occur due to an event that only occurs once or twice early in the ownership's experience (e.g., feels like rough transmission, hesitation happened once) and which cannot typically be duplicated if the vehicle is brought into the dealership for analysis and correction of the perceived problem. Subsequent review of the identified concerns have indicated that most of these shift quality concerns that occurred once or twice early in the ownership experience were subsequently fixed by the normal automatic transmission adaptation process that occurs after the end-customer or owner receives the vehicle from the dealership. These particular shift quality concerns are attributable to a variation in shift quality that occurs because the controller for the automatic transmission has not yet learned how to compensate for manufacturing and part-to-part variation(s).

There is shown in FIG. 1 an exemplary illustration of various shift quality issues, such as shift shock due to tie-up and/or run-up and shift shock due to aggressive input speed gradient when a transmission controller has not learned to compensate for part-to-part and powertrain variation(s).

There also is described in Korean Publication No. 2007-0014566, a shift control system of an automatic transmission of a vehicle and a method thereof capable of adjusting control pressure by using under/over-shooting sense function. In such an invention and engine control sensing unit is provided or formed with various sensors. An engine control unit (ECU) controls the states of an engine by using the engine control sensing unit. A transmission control unit (TCU) performs a shift control process through a shift control driving unit by analyzing information of a shift sensing unit and information of the ECU through a predetermined algorithm. The TCU determines a synchronous point of a target shift gear by comparing a present input RPM of a turbine with a target RPM of the turbine. The TCU maintains a duty control in a present phase according to an under/over-shooting state of the synchronous point.

There also is described in Korean Publication No. 2008-0096902, a method for improving the shift feeling of an auto transmission. Such a method improves durability and shift feeling of the transmission by maintaining the control hydraulic pressure of a confliction element in minimum hydraulic pressure considering the low engine torque. More particularly, such a method includes the steps of: starting engine control of the speed-lowering of an engine torque at a shift starting point; reducing the engine torque from the shift starting point to target torque, enabling the shift by a release element and an engagement element in a state that the engine torque is maintained at the target torque for the interval of the inertial state, and getting the engine torque back to its initial torque after completion of the inertial state.

There also is described in Japanese Publication No. 11-094061 a shift controller of an automatic transmission. As further described, when a shift lever is operated from a D range to a second range after taking a pause in the third range, if the second gear speed is judged during the 4-3 shifting, in the 4-3 shift control, the shifting time is shortened by setting target engaging oil pressure (PTM) higher, whereby shifting response is improved and a shifting feeling is generated. In the 3-2 shifting, a target engaging oil pressure (PTB) is set similarly to a case of automatic shifting by a shifting map, and smooth shifting with little shift shock is performed.

While efforts have been undertaken to provide a controller that can learn and adapt operation of the transmission during day-to-day operation by the end customer, there still remains a need to reduce shift quality issues that are experienced early in the ownership experience.

The above information disclosed in this Background section is only for enhancement of understanding of the background of the invention and therefore it may contain information that does not form the prior art that is already known in this country to a person of ordinary skill in the art.

It thus would be desirable to provide new methods for a quick bedding-in of an automatic transmission of a new vehicle before ownership of the vehicle is transferred to the end customer. It would be particularly desirable to provide such a method that would minimize if not eliminate those shift quality issues generally attributable, for example, to powertrain or part-to-part variation(s) before transfer of ownership to the end customer. It also would be desirable to provide such methods that can be performed during end-of line testing of a vehicle without involving a significant impact on such end-of-line testing.

SUMMARY OF THE INVENTION

In its broadest aspects, the present invention features methods and systems for bedding-in an automatic transmission of a vehicle prior to delivery of the vehicle to an end customer. Such a bedding-in method is performed so as to reduce the occurrence of shifting problems or concerns occurring during the initial stages of ownership of the vehicle. In more particular aspects/embodiments of the present invention, such a bedding-in method includes providing an automatic transmission having a controller that is configured to measure and learn about powertrain variation(s) and configured to adapt one or more operational parameters associated with shifting of the automatic transmission responsive to the measured/learned transmission variation(s).

Such a method also includes operating the vehicle according to a predetermined protocol before the vehicle reaches an end customer. Such a protocol being established so the transmission controller can learn about powertrain variations and adapt operation of the transmission to minimize effects on shifting of the transmission. Such methods preferably can be adapted so that they can be integrated with the normal end-of-line testing of a completed vehicle, however, it also is within the scope of the present invention for such methods or procedures to be carried out at other times. For example the methods of the present invention can be carried out when a new vehicle arrives at a dealership or in after an automatic transmission has been rebuilt.

According to further aspects/embodiments, such operating the vehicle includes dynamically operating the vehicle, where the vehicle or wheels of the vehicle are in motion and where the predetermined protocol is performed while said vehicle is being dynamically operated. Also, such operating the vehicle includes statically operating the vehicle, where the vehicle or wheels of the vehicle are not in motion and where the predetermined protocol is performed while said vehicle is being statically operated.

According to further aspects/embodiments, such operating the vehicle includes operating the vehicle while using a plurality of different protocols, wherein each of the plurality of different protocols is established so that the transmission controller can learn about powertrain variations and adapt operation of the transmission to minimize effects on shifting of the transmission. In yet a more particular embodiment, one of the plurality of predetermined protocols is for when the vehicle is being dynamically operated, where the vehicle or the wheels of the vehicle are in motion, and where another of the plurality of predetermined protocols is for when the vehicle is being statically operated where the vehicle or wheels of the vehicle are not in motion.

In yet a further particular embodiment, such operating the vehicle includes operating the vehicle while using N different protocols, wherein each of the N different protocols is established so that the transmission controller can learn about powertrain variations and adapt operation of the transmission to minimize effects on shifting of the transmission and wherein N is an integer greater than or equal to one of 1, 2, 3 or 8 (i.e., one or more, 2 or more, three or more or 8 or more). One of the N predetermined protocols is for when the vehicle is being dynamically operated, where the vehicle or the wheels of the vehicle are in motion, and where another of the N predetermined protocols is for when the vehicle is being statically operated where the vehicle or wheels of the vehicle are not in motion.

In yet further embodiments, during static operation of the motor vehicle, the automatic transmission is shifted between a neutral transmission position to a drive transmission position. More particularly, the automatic transmission is shifted between a neutral transmission position to a drive transmission position a plurality of times or is shifted between a neutral transmission position to a drive transmission position X times, X being an integer greater than or equal to 1 or 3 (i.e., 1 or more or 3 or more).

In yet further embodiments, during dynamic operation of the motor vehicle the transmission is shifted between one numbered drive transmission position to another numbered drive transmission position. In more particular embodiments, the transmission is shifted between a first numbered drive transmission position to a second numbered drive transmission position and then thereafter shifted between a third numbered drive transmission position to a fourth numbered drive transmission position. Also, in yet further particular embodiments, during such dynamic operation of the motor vehicle the transmission is shifted between the different numbered drive transmission positions while the engine speed is maintained within a predetermined speed range.

According to yet another embodiment of the present invention, such operating of the vehicle includes dynamically operating the vehicle where the vehicle or wheels of the vehicle are in motion and where the predetermined protocol is performed while said vehicle is being dynamically operated and shifting the transmission between one numbered drive transmission position to another numbered drive transmission position.

In yet another embodiment, such a bedding-in method further includes: shifting the automatic transmission between a neutral transmission position and a drive transmission position during static operation of the motor vehicle, and shifting the transmission between one numbered drive transmission position and another numbered drive transmission position during dynamic operation of the motor vehicle. In addition, such shifting of the automatic transmission one of between the neutral transmission position and the drive transmission position a plurality of times or between the neutral transmission position to the drive transmission position X times, X being an integer greater than or equal to 1 or 3 (i.e., 1 or more or 3 or more). Also, during such dynamic operation of the motor vehicle, the transmission is shifted between the first numbered drive transmission position to the second numbered drive transmission position and then shifted between the third numbered drive transmission position to the fourth numbered drive transmission position. Further, during dynamic operation of the motor vehicle, such a methods include shifting the transmission between the different numbered drive transmission positions while the engine speed is being maintained within a predetermined speed range.

In yet further aspects/embodiments of the present invention, such a bedding-in method further includes the step of modifying the software being executed on the transmission controller to complement the predetermined protocol. In yet further embodiments, the software being executed on the transmission controller is modified to complement each of the plurality of predetermined protocols or each of the N predetermined protocols.

According to yet further aspects/embodiments of the present invention, there is featured an end-of-line full vehicle automatic transmission quick bedding-in method. Such method includes configuring a vehicle with an automatic transmission having a controller that is configured to measure and learn about transmission variation(s) and configured to adapt one or more operational parameters associated with shifting of the automatic transmission responsive to the measured/learned transmission variation(s). Such a method also includes operating the vehicle according to a predetermined protocol before the vehicle reaches an end customer, the protocol being established so that the transmission controller can learn about powertrain variations and adapt operation of the transmission to minimize effects on shifting of the transmission. In addition, such operating of the vehicle is performed at the end of the manufacturing line for assembly of the vehicle and before the vehicle is delivered to the end customer.

Other aspects and embodiments of the invention are discussed herein.

DEFINITIONS

The instant invention is most clearly understood with reference to the following definitions:

As used in the specification and claims, the singular form "a", "an" and "the" include plural references unless the context clearly dictates otherwise.

As used herein, the term "comprising" or "including" is intended to mean that the compositions, methods, devices, apparatuses and systems include the recited elements, but do not exclude other elements. "Consisting essentially of", when used to define compositions, devices, apparatuses, systems, and methods, shall mean excluding other elements of any essential significance to the combination. Embodiments defined by each of these transition terms are within the scope of this invention.

A computer readable medium shall be understood to mean any article of manufacture that contains data that can be read by a computer or a carrier wave signal carrying data that can be read by a computer. Such computer readable media includes but is not limited to magnetic media, such as a floppy disk, a flexible disk, a hard disk, reel-to-reel tape, cartridge tape, cassette tape or cards; optical media such as CD-ROM and writeable compact disc; magneto-optical media in disc, tape or card form; paper media, such as punched cards and paper tape; or on carrier wave signal received through a network, wireless network or modem, including radio-frequency signals and infrared signals.

As used in the specification and claims, ECU shall be understood to mean an engine control unit.

As used in the specification and claims, TCU shall be understood to mean a transmission control unit.

As used in the specification and claims, RPM shall be understood to mean a revolutions-per-minute.

As used in the specification and claims, QBI shall be understood to mean Quick Bed-in Process or a bedding-in process of the present invention.

As used in the specification and/or claims, IQS shall be understood to mean an initial quality survey or equivalent survey performed shortly after the purchase of a motor vehicle to determine or identify potential quality issues with the purchased motor vehicle. This shall be understood to also encompass any quality surveys that may be performed or undertaken after repair or replacement of an automatic transmission.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of propulsion/power, for example both gasoline-powered and electric-powered.

USP shall be understood to mean U.S. Patent Number, namely a U.S. patent granted by the U.S. Patent and Trademark Office.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIG. 3B is another illustrative view as to how QBI solenoid specific learning (Key control parameters) are measured during power-on up shifts and N→D static shifts.

FIG. 4 is an illustrative view of a QBI power-on Up Shift Overview.

FIG. 5 is an illustrative view of QBI N→D Static Shift Overview.

DESCRIPTION OF THE PREFERRED EMBODIMENT

Figure 2A:
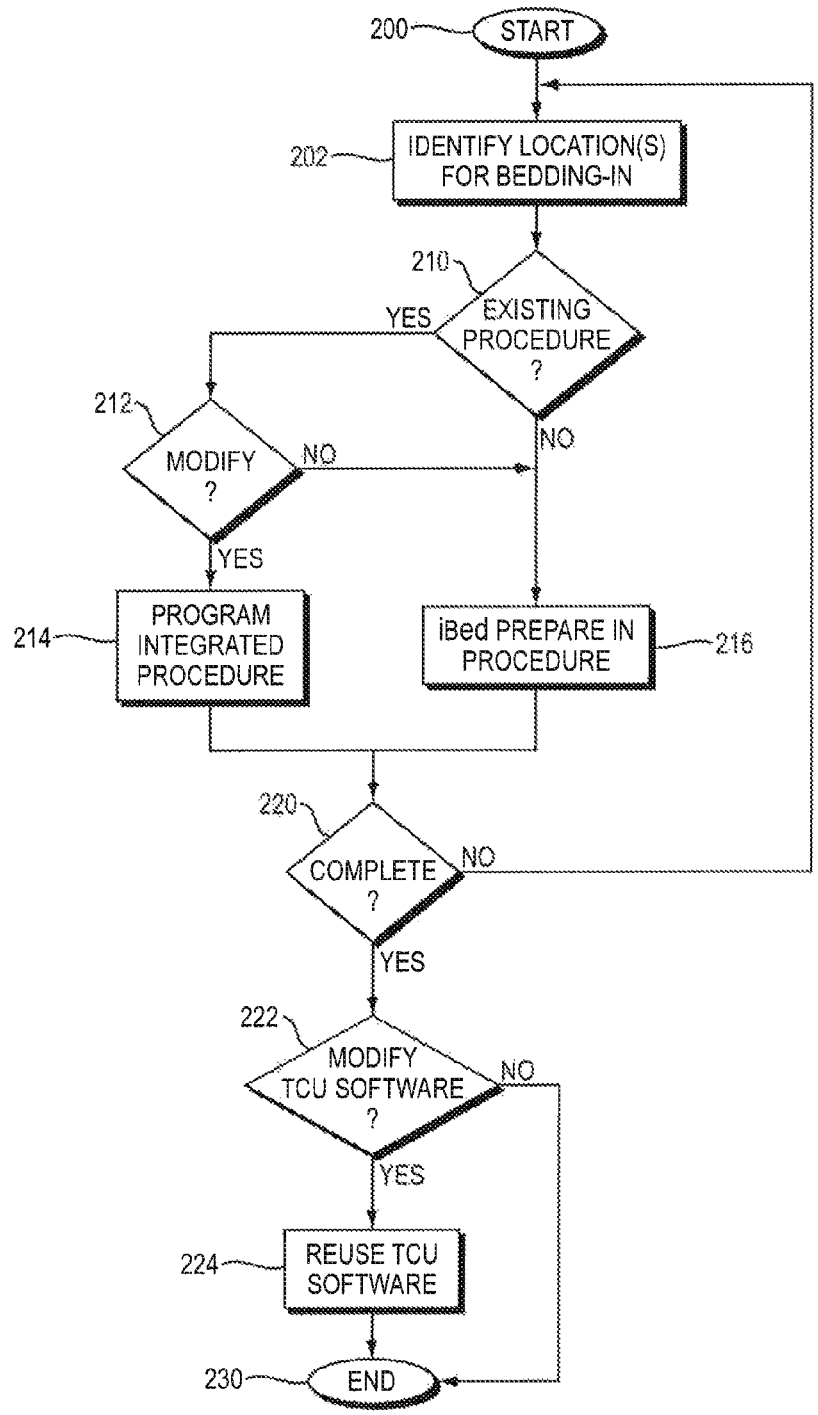
FIGS. 2A-2B are a high level flow diagram illustrating the methods of the present invention including the process for developing the testing protocols/procedures of the present invention (FIG. 2A) and the process for implementing such testing protocols/procedures (FIG. 2B).
Figure 2B:
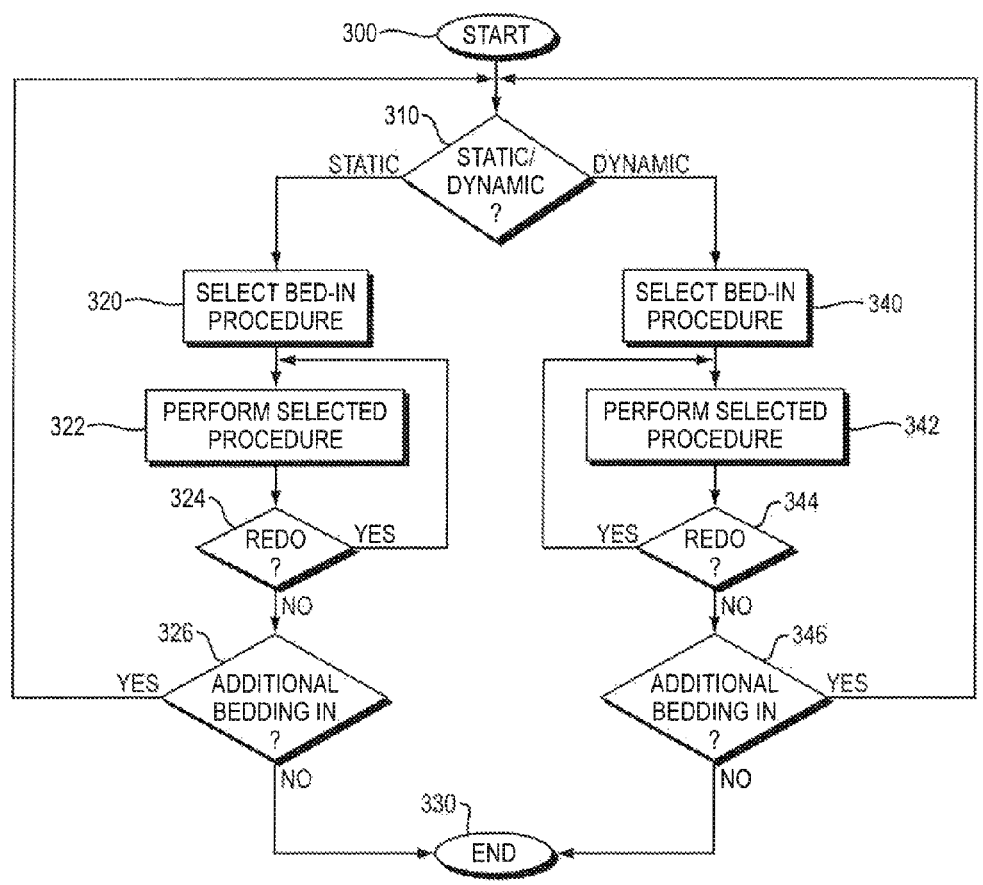

Referring now to the various figures of the drawing wherein like reference characters refer to like parts, there is shown in FIGS. 2A, B high level flow diagrams illustrating the methods of the present invention including the process for developing the bedding-in or quick-bedding-in protocols/procedures of the present invention (FIG. 2A) and the process for implementing such protocols/procedures (FIG. 2B). As described herein, the methods of the present invention can be implemented for newly manufactured motor vehicles at a production or manufacturing facility, can be implemented for newly manufactured motor vehicles when it is received at a dealership; can be implemented for motor vehicles at a dealership when the powertrain or transmission is being repaired/replaced (for example under warranty) or can be implemented for a motor vehicle whose transmission is being repaired or replaced at a dealership or third party. The foregoing is illustrative and should not be considered as limiting the scope of the present invention to the identified potential uses.

As also described herein, such methods of the present invention can be static or dynamic procedures. In a static method/procedure, the motor vehicle and its wheels are not moving. For example, a motor vehicle whose brakes are engaged while the transmission is being shifted between neutral and drive would be a static procedure. In a dynamic method/procedure, the motor vehicle and/or its wheels are moving. A motor vehicle located in a rolling test booth and/or secured to prevent vehicular movement but allowing rotation of at least the drive wheel(s) or a motor vehicle being driven on a test track are examples of a dynamic procedure.

The process for developing the protocols/procedures according to the present invention, as shown in FIG. 2A, starts (Step 200) and such starting generally includes the identification and specification of information necessary for the development of a given bedding in procedure/methodology as well as identifying any changes that may be required for the software being executed on the transmission controller or transmission control unit (TCU). For example, such information includes identifying whether a given procedure or methodology is going to be a static or dynamic as well as identifying what functionalities of the automatic transmission should be exercised using such a procedure/methodology. As described further herein, it should be recognized that more than one procedure/methodology can be developed for exercising functionalities of an automatic transmission and implemented on a motor vehicle before the vehicle is provided to an end customer. As to the TCU, consideration is given to updating or modifying the software be executed on the TCU (i.e., the microprocessor, ASIC and the like thereof) so as to handle the inputs being received during the bedding-in process.

In addition to such information, the process includes identifying the location where a given bedding-in or quick bedding procedure would be implemented, Step 202. For example, if a given procedure/methodology is a dynamic procedure, one would identify where implementation would be carried out, such as for example a motor vehicle being driven on a test track in proximity to the manufacturing facility, a motor vehicle on a rolling test booth at a manufacturing facility, or a motor vehicle being driven on a public or private road. Similarly, for a static procedure/methodology, the location (e.g., location at manufacturing facility or dealership) would be specified. The identification of the location also would include an identification of other facilities at the location, that can be relied upon or used during implementation of the procedure. For example, displays can be provided at a rolling test booths, which can provide prompts to the drivers as to the protocol to be followed and whether the procedure was correctly implemented or not by the actions of the driver. In contrast, such displays are not likely found on the test track or in the vehicles moving on a test track.

After obtaining the information necessary to develop a given method/procedure, it is next determined if there is an existing procedure, Step 210 that is being implemented at the identified location. It is a common practice to perform one or more tests of a completely assembled vehicle to determine the vehicles' acceptability for sale and safety. Thus, one consideration in connection with the procedures/methods of the present invention is whether or not an existing testing procedure should be modified (Step 212) so as to embody protocols and/or instructions for implementing a bedding-in procedure/method of the present invention. For example, when the motor vehicle is moving about a test track, vehicle testing procedures and bedding in procedures are preferably integrated into a single procedure because the testing and bedding procedures are integrally performed and not performed separately or in series. On the other hand it might be possible to separately perform rolling test booth testing procedures and bedding in procedures.

In the case where an existing procedure should be modified so as to integrate therewith a bedding-in procedure of the present invention (Yes, Step 212) then an integrated procedure is prepared, Step 210. In such a case, the existing procedure would be evaluated to determine if the requirements for the different conditions or protocols for the one or more events associated with the desired bedding-in procedure can be integrated into the existing procedure or whether the existing procedure needs to be further modified so as to allow such modification.

In addition, the test environment conditions of the existing procedure or the timing of when such conditions would be imposed during the test cycle are evaluated to determine their effect, if any, on the integration of the bedding-in procedure and the existing procedure. In either case, the sequencing of the events associated with a bedding-in procedure, for example. may require a different sequencing of testing events.

Such an integrated procedure would include instructions and protocols for the driver to take so that the automatic transmission is exercised in a desired manner whereby operating conditions can be measured, assessed and learned by the transmission controller. From this the transmission controller can determine if operating parameters of the transmission need to be adapted or adjusted so that operation of transmission functionalities is adjusted to compensate for variations between targeted or desired operational characteristics of the transmission (e.g., developed hydraulic pressure and switching time) and those determined from the performance of the bedding-in procedure.

If there is no existing procedure (No, Step 210) or an existing procedure should not be modified (No, Step 212), then a stand alone bedding-in procedure is prepared (Step 216). In such a case, the stand alone bedding-in procedure is performed separate from an existing procedure or is performed on its own. For example, the bedding-in procedure and an existing test procedure are performed in series or one after the other. Also and particularly in the case of static bedding-in procedures, the bedding-in procedure is a stand alone procedure that is performed when it is appropriate. Also, such a stand alone bedding-in procedure can be performed at a location that is different from other static procedures or at the same location.

After a bedding-in procedure is completed (Steps 214, 216), the process continues with determining whether all of the bedding-in procedures are completed or not (Step 220). For example, in the present invention a vehicle can undergo one or more static procedures, one or more dynamic procedures, or both one or more static procedures and one or more dynamic procedures. Thus, it is likely necessary that N bedding in procedures be developed to be performed for a given vehicle at a given location, where N is an integer greater than or equal to 1 or more, 3 or more, 4 or more, 6 or more, or 8 or more. Therefore, if all or the N bedding-in procedures have not been completed (No, Step 220), then the process returns to identifying the information and location for the next bedding-in procedure (steps 200, 202). Thereafter, the process continues with the steps intermediate step 202 and step 220.

If it is determined that all or the N bedding-in procedures have been completed (Yes, Step 220), then the process continues with an evaluation of the software program being executed on the TCU to determine if it should be updated or modified to facilitate the use of the bedding-in data or information obtained using the integrated procedure and/or the stand alone procedure (Step 222). If such a modification is determined to desirable (Yes, Step 222), then the TCU software is updated (Step 224) so that the obtained data and/or information can be used to determine a variation between a measured or sensed parameter or operational characteristic and a targeted or desired value, parameter, and/or characteristic. From this the TCU also can determine an appropriate adaptation or adjustment to the operation of the automatic transmission, such as for example adjusting the shift time and/or hydraulic pressure being developed during a shift, so as to compensate for the determined variation. As the bedding-in procedure is based on a limited number of inputs from the dynamic and/or static bedding-in procedures, the software also can be updated or modified so as to handle and given appropriate weight to the number of data points provided.

If it is determined that the TCU software does not need to be updated/modified (No, Step 222) or after preparing the updated/modified TCU software (Step 224), then the process of developing bedding-in procedures and the updating of TCU software for a given vehicle and automatic transmission ends (Step 230). The process then continues with determining if there is a need to prepare bedding-in procedures and/or updated TCU software for another automatic transmission/powertrain combination for the same vehicle or if there is a need to prepare bedding-in procedures and/or updated TCU software for the automatic transmission/powertrain combination for another vehicle. If this is the case, then the process repeats the process described above and shown on FIG. 2A for the another automatic transmission/powertrain combination or the another vehicle.

After the process of developing bedding-in procedures is completed for one or more of the potential transmission/powertrain combinations and for one or more of the different vehicles being marketed, the bedding-in procedures/methods of the present invention are used to bed-in the automatic transmission/powertrain of a given vehicle. Thus, when a given vehicle is available for such bedding-in, the process is started (Step 300) and continues with determining if the bedding procedure being implemented is a static procedure or a dynamic procedure and where the particular procedure is to be carried out or performed, Step 310. For example, it is determined whether the dynamic procedure is to be performed on, for example, a test track or in a rolling test booth (or the like) and whether the static procedure is to be performed, for example at an established static test site or a static site specifically established for execution of the static bedding-in procedure.

If the procedure is a static procedure (Static, Step 310), then process continues with selecting the appropriate static bedding in procedure for that vehicle including the particular automatic transmission/powertrain combination, and the vehicle location under the procedure (Step 320). After the vehicle is located at the desired vehicle location, the process proceeds with performing the selected procedure (Step 322). If displays are provided at the vehicle location, such displays can be used to provide prompts and instructions to the driver or vehicle operator as assistance in carrying out the bedding in procedure.

It also is within the scope of the present invention, for the vehicle to be connected to instrumentation or sensors that can provide feedback as to the correctness or success as to the performance of the selected procedure. For example, if a given process in the bedding-in procedure is required to be performed for a given length of time, then the process can provide a feedback as to whether the process was performed for the required amount of time and if not provide an indication that the process was not correctly or successfully performed.

Thus, the process or methods of the present invention further includes an assessment (redo—Step 320) as to the success of the bedding-in procedure and whether the process needs to be re-done in at least some respect. In the case, where the implementation of the procedure is not completely successful and needs to be re-done (Yes, Step 324), then the process returns to Step 322 and the selected procedure is again implemented. In such a case, the procedure is done at least to make up for the missing process/element(s) or is completely re-done.

If the selected procedure does not have to be re-done (No, Step 324) then the process continues with determining if there is another bedding-in procedure that needs to be performed (Step 326). As indicated above, it is within the scope of the present invention for there to be N bedding-in procedures to be performed for a given vehicle, some static and some dynamic. If there is no other bedding in procedure(s) to be performed, then the process ends (Step 330). If there is another bedding in procedure that needs to be performed, then the process returns to Step 310 and again determines if the bedding procedure being implemented is a static procedure or a dynamic procedure and where the particular procedure is to be carried out.

If the procedure is a dynamic procedure (Dynamic, Step 310), then the process continues with selecting the appropriate dynamic bedding in procedure for that vehicle, that vehicle location and the transmission/powertrain combination for the vehicle (Step 340). After the vehicle is located at the desired vehicle location for the dynamic procedure, the process proceeds with performing the selected procedure (Step 342). For example, if the vehicle is mounted on the rollers at a rolling testing booth, then the process proceeds with performing the selected dynamic procedure, which can be an integrated procedure or a stand alone procedure. If displays are provided at the rolling test booth, then such displays can be used to provide prompts and instructions to the driver or vehicle operator as assistance in carrying out the bedding in procedure. Such assistance provides a mechanism to minimize the potential for operator error while performing the bedding-in procedure and thereby minimizing the need for a redo as described below (Step 344).

If the vehicle is located at the start of the test track, then the process proceeds with performing the selected dynamic procedure, which is typically an integrated procedure that combines elements of the bedding in procedure and elements of the tests to be performed on the test track.

It also is within the scope of the present invention, for the vehicle to be connected to instrumentation or sensors that can provide feedback as to the correctness or success as to the performance of the selected dynamic procedure. Thus, the process or methods of the present invention further includes an assessment (redo—Step 344) as to the success of the bedding-in procedure and whether the process needs to be re-done in at least some respect. In the case, where the implementation of the procedure is not completely successful and needs to be re-done (Yes, Step 344), then the process returns to Step 342 and the selected procedure is again implemented. In such a case, the procedure is done at least to make up for the missing element(s) or is completely re-done. Alternatively, a different dynamic procedure can be selected to exercise the transmission functionalities at a different location. For example, if the bedding-in procedure that failed was performed on the test track, then the re-do can be performed at a rolling test booth while using the related procedure.

If the selected procedure does not have to be re-done (No, Step 344) then the process continues with determining if there is another bedding-in procedure that needs to be performed (Step 346). If there is another bedding in procedure that needs to be performed, then the process returns to Step 310 and again determines if the bedding procedure being implemented is a static procedure or a dynamic procedure and where the particular procedure is to be carried out. If there is no other bedding in procedure to be performed, then the process ends (Step 330).

Quick Bed-in Process and Implementation at a Manufacturing Plant

Clutch Specific Solenoid Learning

Figure 1:
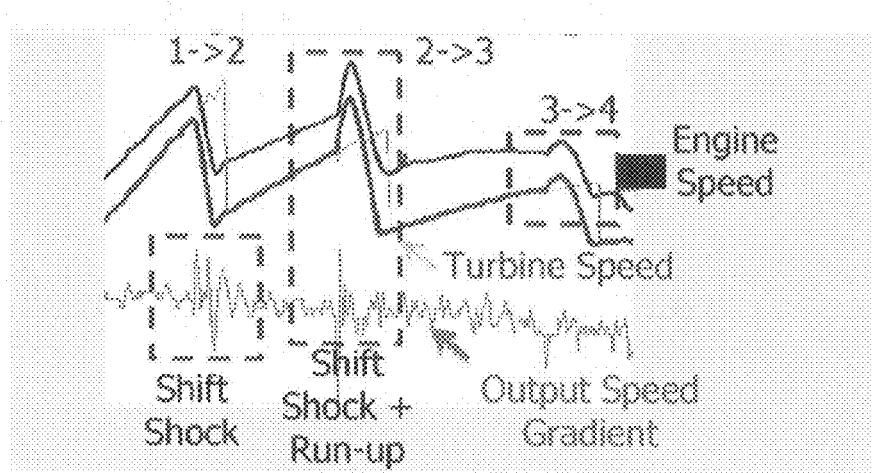
FIG. 1 is an exemplary illustration that depicts various shift quality issues, such as shift shock, shift shock due to run-up and/or tie-up and shift shock due to aggressive input speed gradient when a transmission controller has not learned to compensate for part-to-part and powertrain variation(s).
Figure 3A:
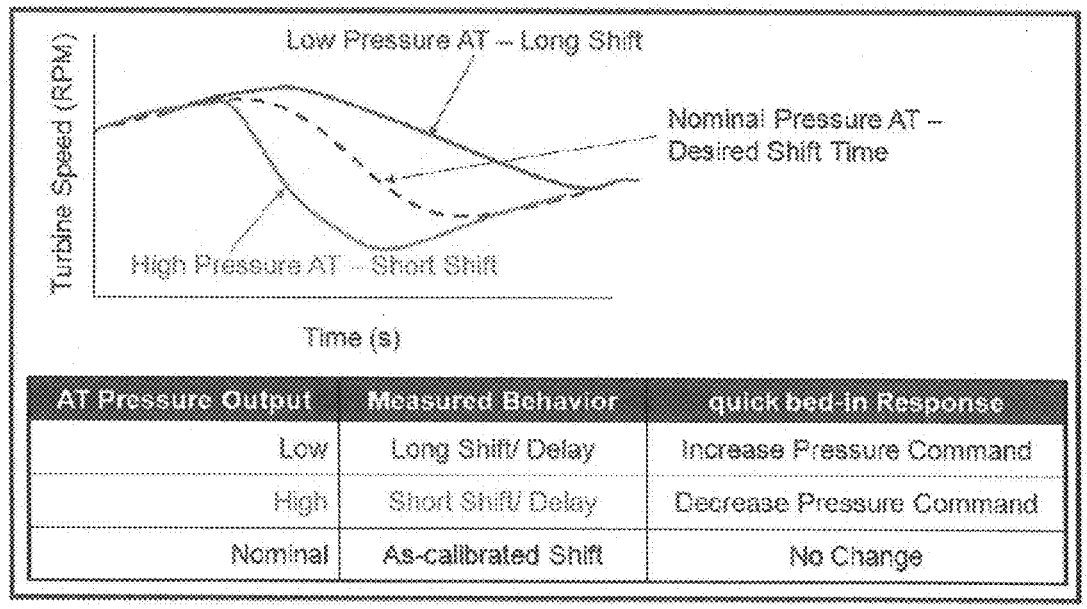
FIG. 3A is an illustrative view of the QBI process showing how the process measures actual performance of the automatic transmission (AT) and how the TCU adjust control so that the automatic transmission can thereafter achieve expected performance.

Transmission software logic was developed to perform QBI by measuring key control parameters and then applying control offsets if measured performance differs from expected performance. This process is completed for each specific transmission clutch control solenoid to compensate for part to part manufacturing variation as well as variations that occur in the powertrain. There is provided in FIG. 3A, an illustrative view QBI process showing how the process measures actual performance of the automatic transmission (AT) and how the TCU adjust control so that the automatic transmission can thereafter achieve expected performance.

Key control parameters are measured during power-on up shifts and N→D static shifts in support of QBI (see FIG. 3B). In order to assure that learned QBI solenoid offsets (solenoids for the automatic transmission) are consistently applied, QBI control logic limits learning to a specific range where the solenoids have been extensively characterized. Transmission control software monitors specific parameters and only allows learning in a defined range. This assures that learning can only occur in a region where proper solenoid characterization can be achieved. Based on current CMa, XMa, and YFa calibrations, APS (Accelerator Pedal/Sensor/Position) between approximately 15% to 25% and transmission temperature between 30° C. and 120 C is required to enable QBI learning functionality.

For purposes of illustration, the transmission is configured so as to include four clutches. The 26B, 35R, and overdrive (OD) clutch solenoids are learned-in by performing power-on up shifts within the ranges stated above. The UD (Underdrive clutch) clutch solenoid is learned-in by performing N→D static shifts. There is shown in FIGS. 4 and 5 an overview of each maneuver. The maneuvers shown above should be completed four separate times in order to complete the QBI process. After QBI completion, solenoid and clutch hardware are closely matched in order to reduce the likelihood of S/Q issues, thus helping to improve customer initial IQS.

Manufacturing Plant Final Drive Cycle

Figure 6:
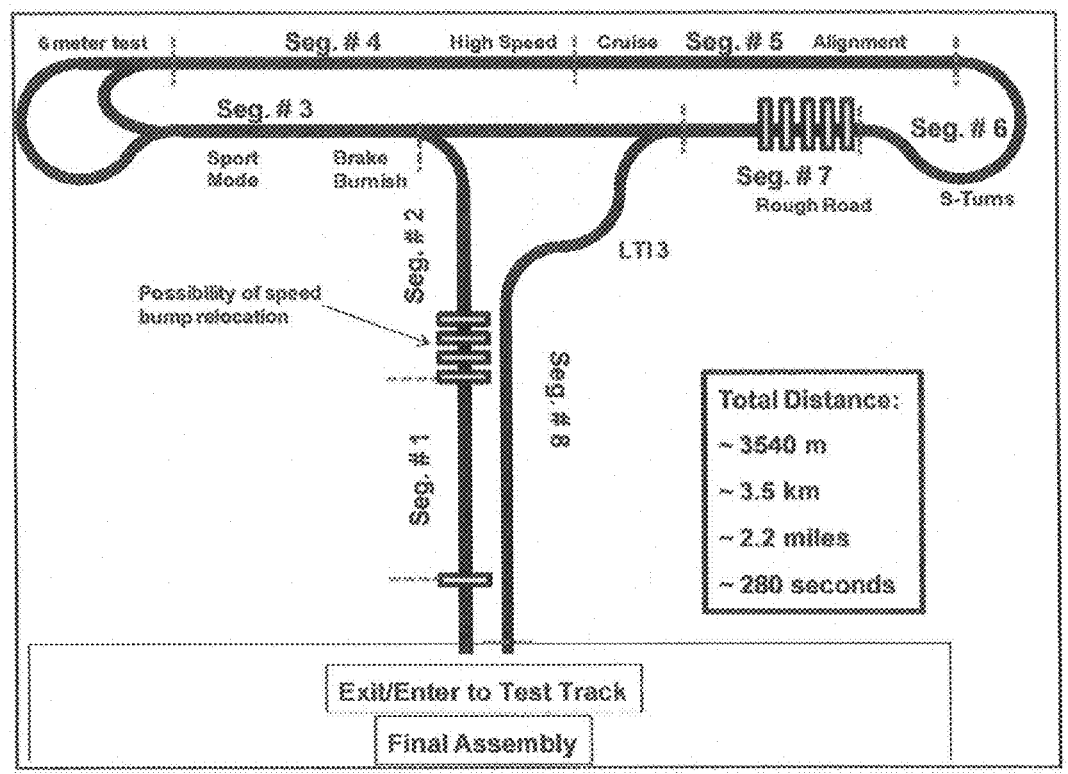
FIG. 6 is an illustration of the final evaluation drive cycle for one plant.
Figure 7:
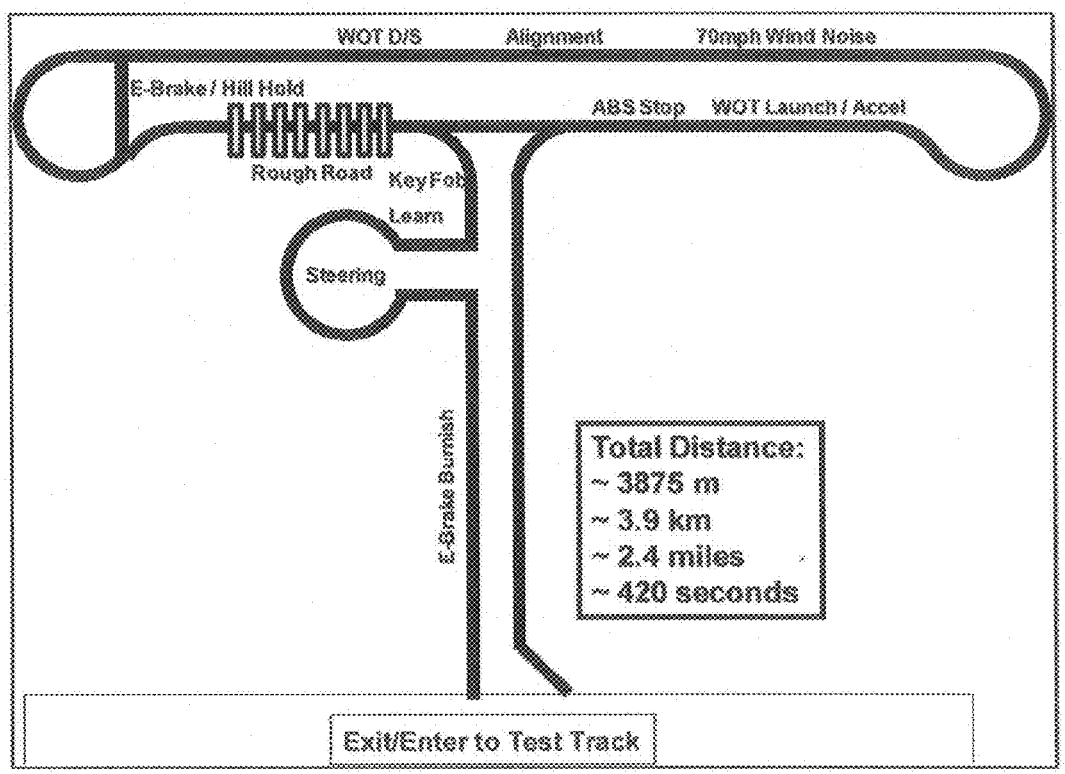
FIG. 7 is an illustration of the final evaluation drive cycle for another plant.

In order to implement the QBI procedure into a current manufacturing plant assembly line process, it is necessary to understand the current process as cycle time is very important. Since QBI requires the engine and transmission to be connected and operational as the customer would receive it, the logical place to perform the QBI procedure is during the final drive evaluation of the vehicle. Each of the two plants referred to herein has an on-site test track to perform a final evaluation drive. Data was collected data during this final evaluation drive in order to provide a simple time study of the current maneuvers required by the assembly plant. This can then be used to determine were to input the QBI procedure without affecting manufacturing cycle time. The results of the study for the two different plants are shown in FIGS. 6 and 7.

QBI Procedure

Figure 8:
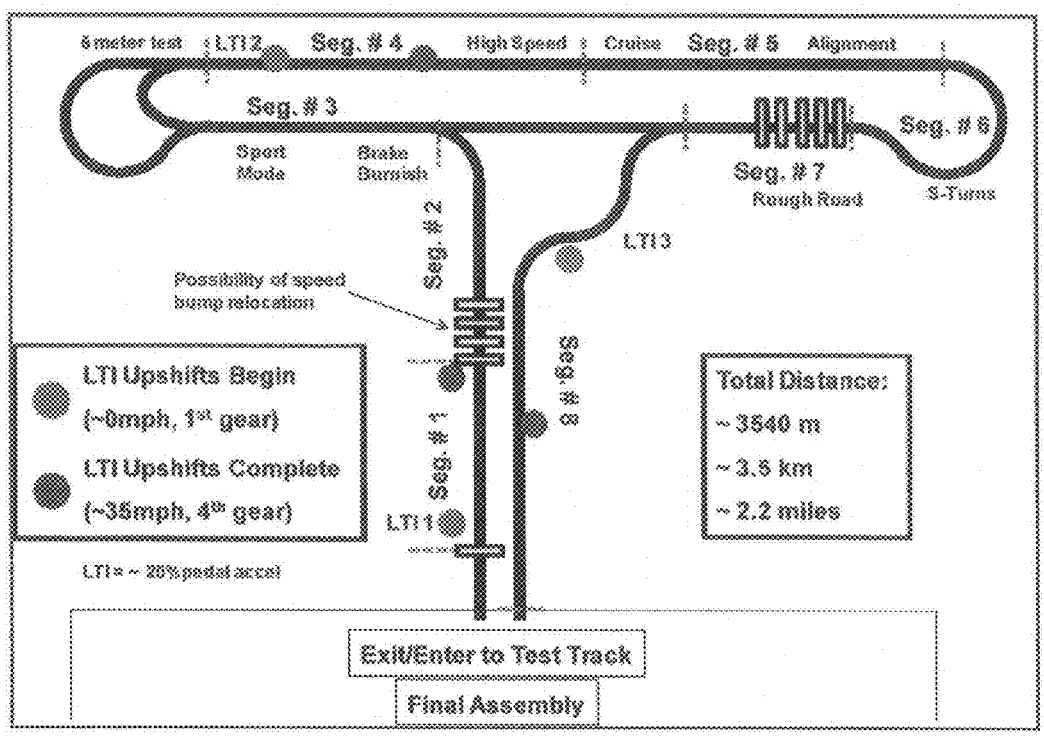
FIG. 8 is an illustration of the proposed QBI process during the final evaluation drive cycle for one plant.
Figure 9:
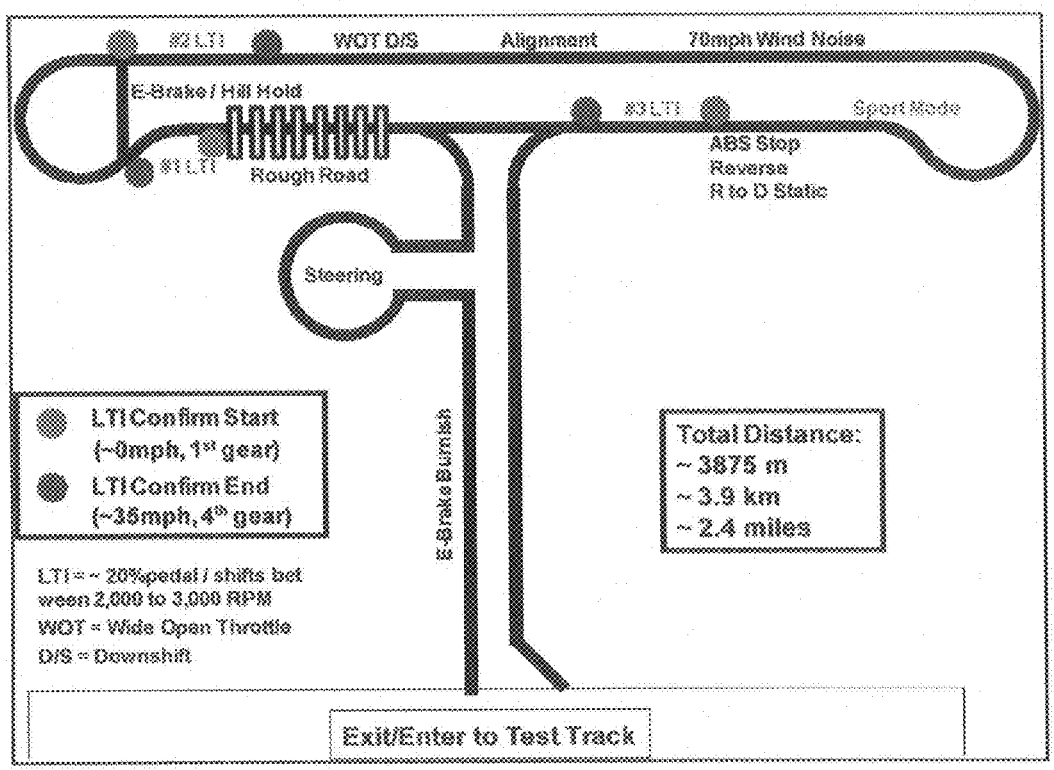
FIG. 9 is an illustration of the proposed QBI process during the final evaluation drive cycle for another plant.
Figure 10:
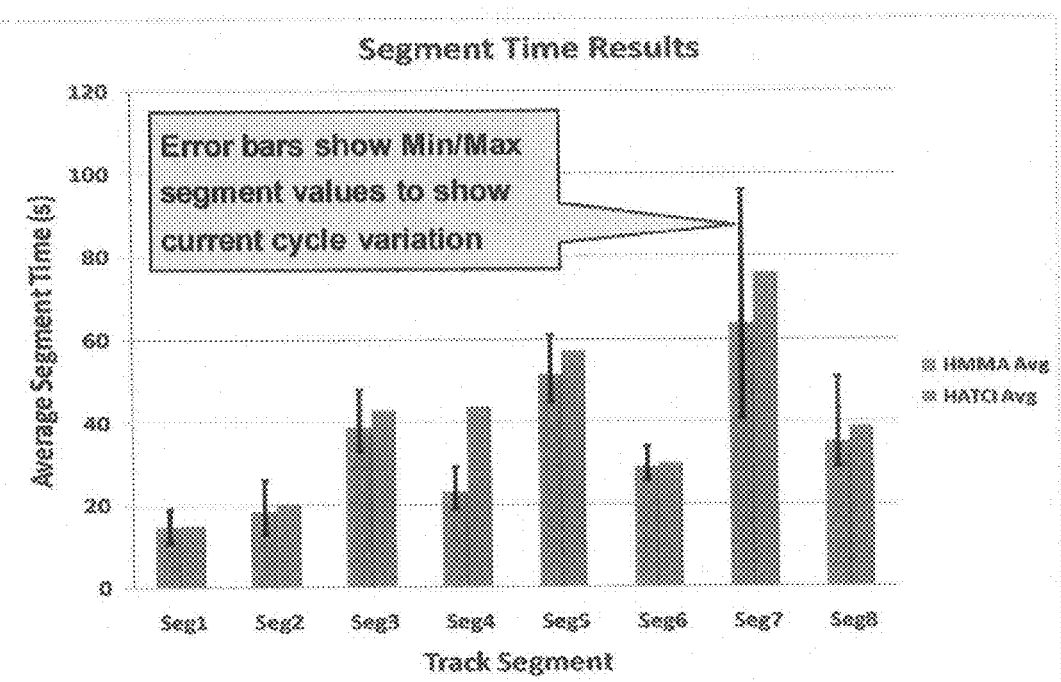
FIG. 10 shows a time study that was done for the proposed QBI process during the final evaluation drive cycle for one plant.

After thorough review of the maneuvers and time limit requirements for the final evaluation drive cycle at the two plants, a drive cycle was proposed including the locations for N→D static shift learning for the UD clutch as well as the light tip-in (LTI) accelerations for learning the 26B, 35R and OD clutches. Since the track layout and required driving maneuvers differ between the two plants each proposed cycle is shown in FIGS. 8 and 9. A time study also was performed for the proposed drive cycle. The time study was based on an average of ten drivers completing the current drive cycle compared to an average of three proposed cycles. The time study results are shown in FIG. 10. Even though three of the eight segments (the locations of the LTI Launch/Accelerations) show a slightly higher time then the current cycle, the error bars show they are still well within driver to driver variation of the current cycle.

Figure 11:
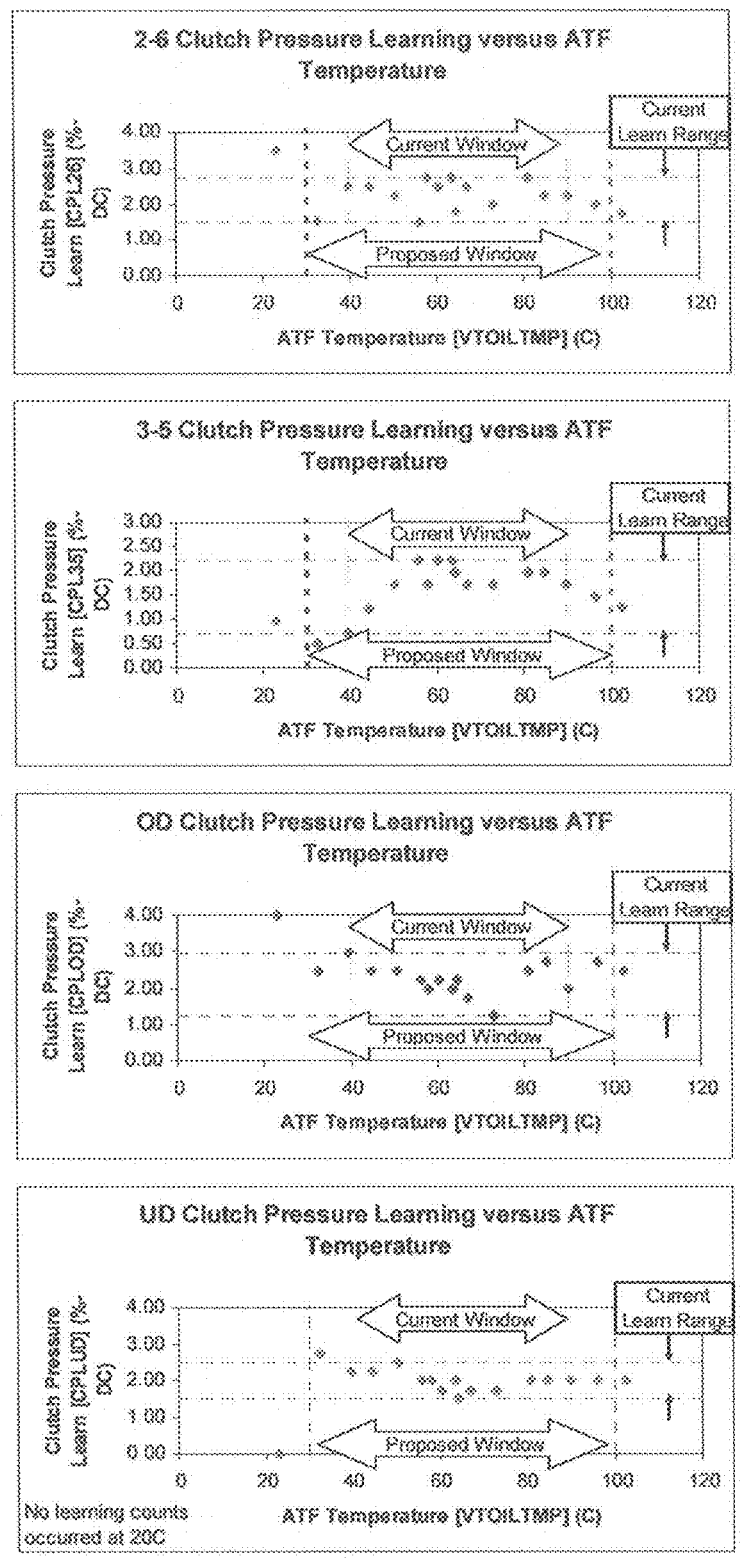
FIG. 11 provides illustrative views showing results of clutch pressure learning versus ATF temperature tests for the different clutches.

The transmission coolant temperature breakpoint calibration for QBI needs to be set so as to allow N→D static shift learning. Thus, the TCU software enable criteria calibration of 40° C. was reduced to 30° C. to allow learning. FIG. 11 provides illustrative views showing results of clutch pressure learning versus ATF temperature tests for the different clutches.

At one plant, the location of the speed bumps were moved further down the entrance road toward the track after the plant exit to allow enough room to complete the first proposed LTI up shifts.

QBI Process Implementation

The N→D static shifts preferably are to be performed first during an automated diagnostic session (ADS) and Post ADS. Static shifts can also be completed while waiting for plant exit door to open. Plant drivers also were instructed to perform N→D static shifts just before the water-intrusion shower test if time permits.

Figure 12:
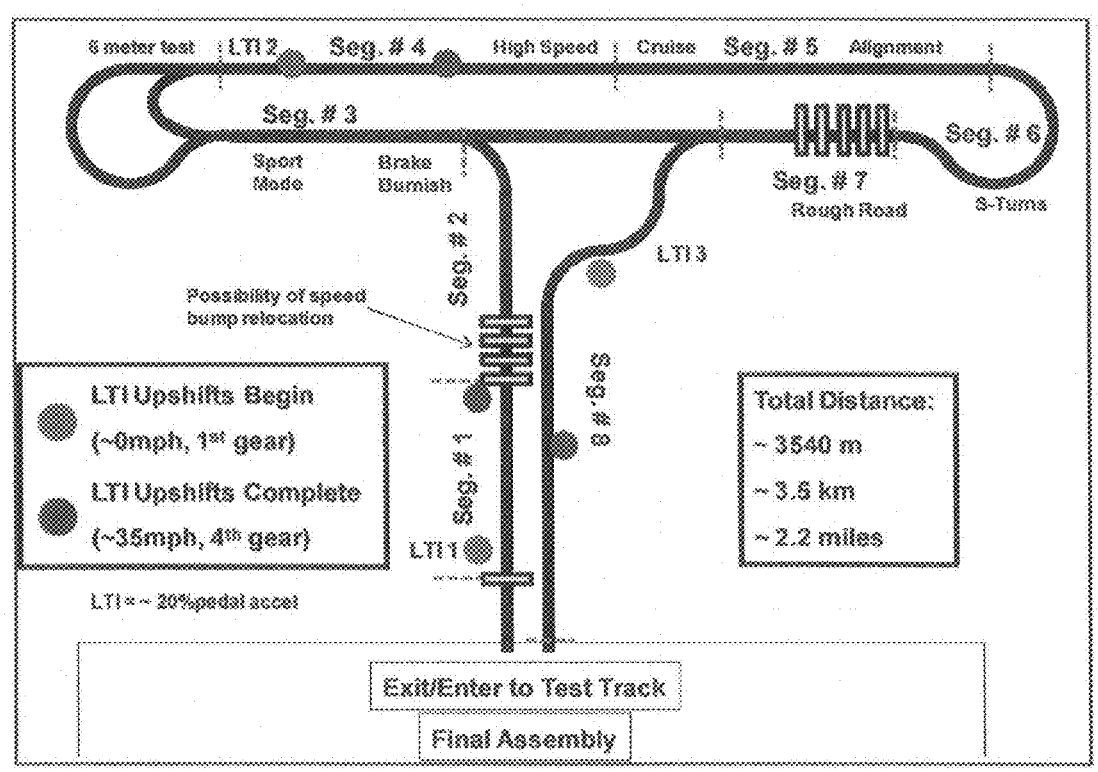
FIG. 12 is an illustration of the proposed locations for QBI light tip-in (LTI) accelerations/maneuvers for the final evaluation drive cycle for one plant.
Figure 13:
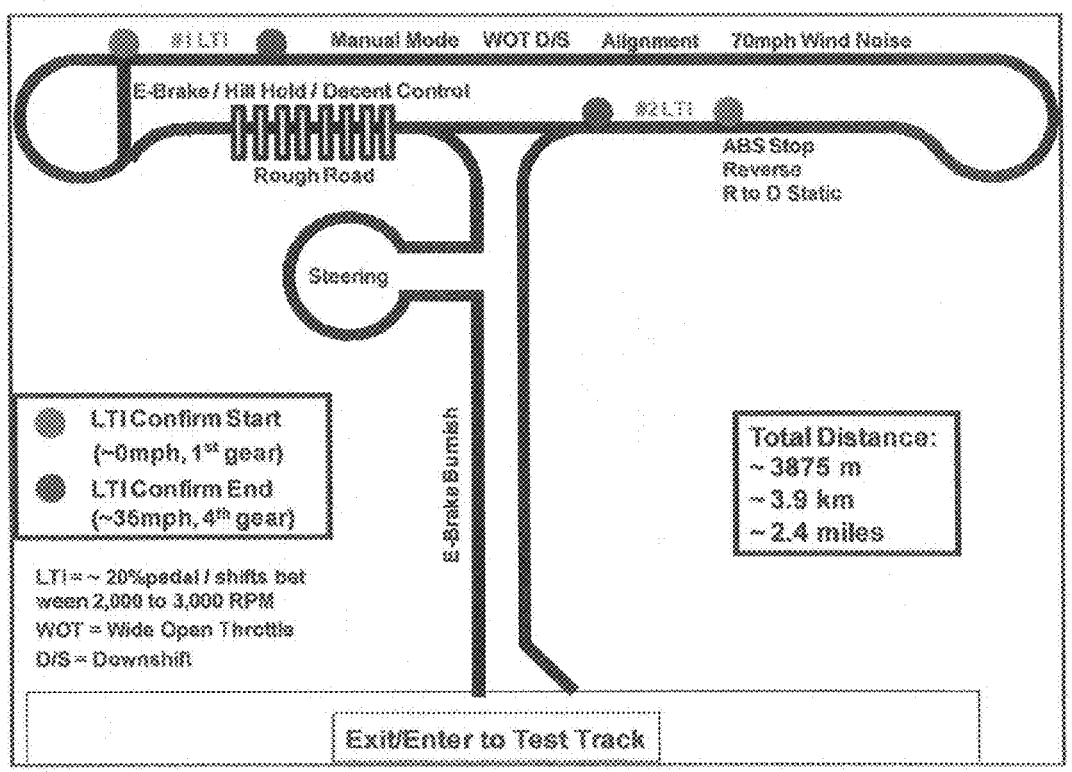
FIG. 13 is an illustration of the proposed locations for QBI LTI accelerations/maneuvers for the final evaluation drive cycle for the another plant.

At one plant, three LTI acceleration events are to be performed. The first LTI maneuver is to be completed just outside of plant exit door after the single "safety" speed bump. The second LTI maneuver is to be completed after the 6 meter test on the back straight of the test track. The third and final LTI is to be completed from the stop that occurs after driving around the track building heading back towards the plant entrance. At the second plant, two LTI events are to be performed, the first LTI occurs after the e-brake hill hold/decent mode test. The second LTI is performed after the ABS stop heading back to the track building. There is shown in FIGS. 12 and 13, an outline of the locations for these QBI LTI maneuvers.

Figure 14:
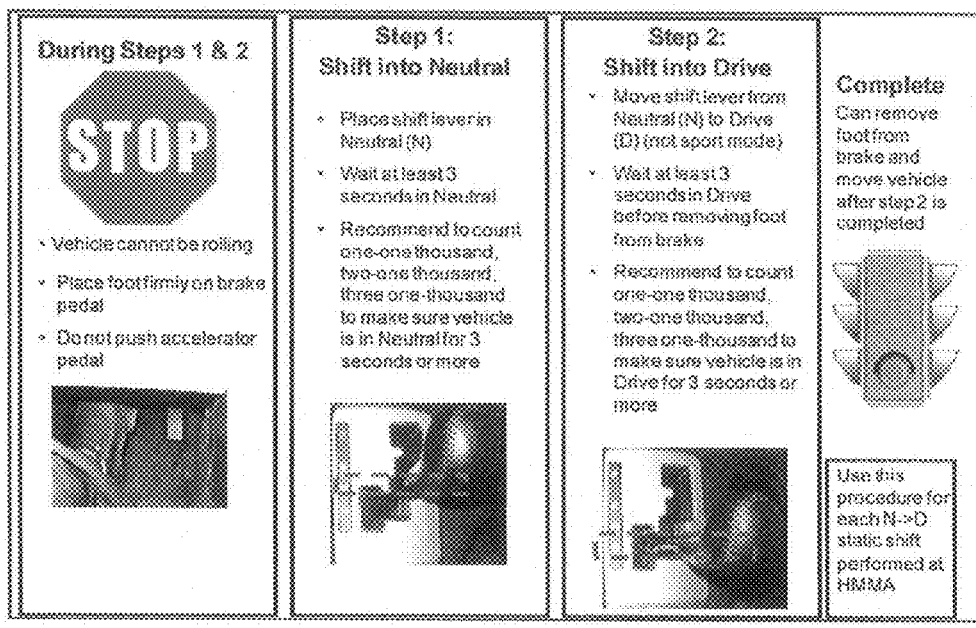
FIGS. 14 and 15 are illustrations of illustrative instructions provided to the drivers performing QBI procedures.
Figure 15:
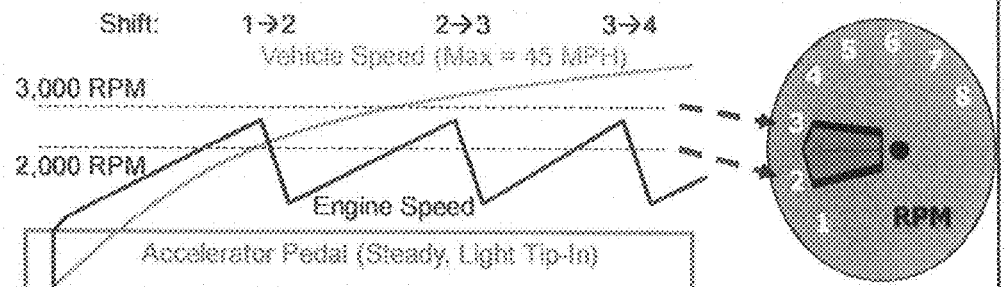

There is shown in FIGS. 14 and 15 illustrative instructions to the drivers relating to QBI.

QBI has potential to significantly improve AT IQS by compensating for manufacturing part-to-part variation and/or powertrain variations before a vehicle reaches end-customers.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A method for begging-in an automatic transmission of a vehicle prior to delivery of the vehicle to an end customer, said bedding-in method comprising the steps of:
providing an automatic transmission having a controller that is configured to measure and learn about transmission variations while the engine is running and configured to adapt one or more operational parameters associated with shifting of the automatic transmission responsive to the measured and learned transmission variations; and operating the vehicle according to a predetermined protocol before the vehicle reaches an end customer, the protocol being established so that the transmission controller learns about powertrain variations and adapts operation of the transmission to minimize effects on shifting of the transmission, wherein said operating the vehicle includes static operating where the vehicle or wheels of the vehicle are not in motion and where the predetermined protocol is performed while said vehicle is statically operated, wherein during said static operation of the motor vehicle, the automatic transmission is shifted between a neutral transmission position to a drive transmission position a plurality of times and there is at least 3 seconds between each shift.

2. The bedding-in method of claim 1, wherein said operating the vehicle includes dynamically operating where the vehicle or wheels of the vehicle are in motion and where the predetermined protocol is performed while said vehicle is being dynamically operated.

3. The bedding-in method of claim 1, wherein said operating the vehicle includes operating the vehicle while using a plurality of different protocols, wherein each of the plurality of different protocols is established so that the transmission controller learns about powertrain variations and adapts operation of the transmission to minimize effects on shifting of the transmission.

4. The bedding-in method of claim 1, further comprising the step of modifying software being executed on the transmission controller to complement the predetermined protocol.

5. The bedding-in method of claim 1, wherein said operating the vehicle includes operating the vehicle while using N different protocols, wherein each of the N different protocols is established so that the transmission controller learns about powertrain variations and adapts operation of the transmission to minimize effects on shifting of the transmission and wherein N is an integer greater than or equal to one of 1, 2, 3 or 8.

6. The bedding-in method of claim 5, wherein one of the N predetermined protocols is for when the vehicle is being dynamically operated, where the vehicle or the wheels of the vehicle are in motion, and where another of the N predetermined protocols is for when the vehicle is being statically operated where the vehicle or wheels of the vehicle are not in motion.

7. The bedding-in method of claim 3, wherein one of the plurality of predetermined protocols is for when the vehicle is being dynamically operated, where the vehicle or the wheels of the vehicle are in motion, and where another of the plurality of predetermined protocols is for when the vehicle is being statically operated where the vehicle or wheels of the vehicle are not in motion.

8. The bedding-in method of claim 2, wherein during said dynamic operation of the motor vehicle the transmission is shifted between one numbered drive transmission position to another numbered drive transmission position.

9. The bedding-in method of claim 2, wherein during said dynamic operation of the motor vehicle the transmission is shifted between a first numbered drive transmission position to a second numbered drive transmission position and then thereafter shifted between a third numbered drive transmission position to a fourth numbered drive transmission position.

10. The bedding-in method of claim 9, wherein during said dynamic operation of the motor vehicle the transmission is shifted while the engine speed is maintained within a predetermined speed range.

11. The bedding-in method of claim 7, wherein:
during said static operation of the motor vehicle, the automatic transmission is shifted between a neutral transmission position to a drive transmission position; and
during said dynamic operation of the motor vehicle the transmission is shifted between one numbered drive transmission position to another numbered drive transmission position.

12. The bedding-in method of claim 11, wherein during said dynamic operation of the motor vehicle the transmission is shifted between a first numbered drive transmission position to a second numbered drive transmission position and then shifted between a third numbered drive transmission position to a fourth numbered drive transmission position.

13. The bedding-in method of claim 11, wherein during said dynamic operation of the motor vehicle the transmission is shifted while the engine speed is maintained within a predetermined speed range.

14. An end-of-line full vehicle automatic transmission quick bedding-in method comprising the steps of:
Configuring a vehicle with an automatic transmission having a controller that is configured to measure and learn about transmission variations and configured to adapt one or more operational parameters associated with shifting of the automatic transmission responsive to the measured and learned transmission variations;
operating the vehicle according to a predetermined protocol before the vehicle reaches an end customer, the protocol being established so that the transmission controller learns about powertrain variations and adapts operation of the transmission to minimize effects on shifting of the transmission; and
wherein said operating the vehicle is performed at the end of the manufacturing line for assembly of the vehicle,
wherein said operating the vehicle includes static operating where the vehicle or wheels of the vehicle are not in motion and where the predetermined protocol is performed while said vehicle is statically operated, and
wherein during said static operation of the motor vehicle, the automatic transmission is shifted between a neutral transmission position to a drive transmission position a plurality of times and there is at least 3 seconds between each shift.

* * * * *